United States Patent
Uhlig et al.

(10) Patent No.: US 7,802,250 B2
(45) Date of Patent: Sep. 21, 2010

(54) SUPPORT FOR TRANSITIONING TO A VIRTUAL MACHINE MONITOR BASED UPON THE PRIVILEGE LEVEL OF GUEST SOFTWARE

(75) Inventors: Volkmar Uhlig, Karlsruhe (DE); Steven M. Bennett, Hillsboro, OR (US); Erik C. Cota-Robles, Portland, OR (US); Sebastian S. Schoenberg, Hillsboro, OR (US); Andrew V. Anderson, Hillsboro, OR (US); Richard A. Uhlig, Hillsboro, OR (US); Gilbert Neiger, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1724 days.

(21) Appl. No.: 10/880,057

(22) Filed: Jun. 28, 2004

(65) Prior Publication Data

US 2005/0289542 A1 Dec. 29, 2005

(51) Int. Cl.
*G06F 9/455* (2006.01)
(52) U.S. Cl. .................................................. 718/1
(58) Field of Classification Search .................. 718/1
See application file for complete search history.

(56) References Cited

U.S. PATENT DOCUMENTS

| | | | |
|---|---|---|---|
| 4,787,031 A * | 11/1988 | Karger et al. | 718/100 |
| 6,907,600 B2 * | 6/2005 | Neiger et al. | 717/139 |
| 2002/0082824 A1 * | 6/2002 | Neiger et al. | 704/2 |
| 2004/0025158 A1 | 2/2004 | Traut | |

FOREIGN PATENT DOCUMENTS

| | | |
|---|---|---|
| CN | 1506861 A | 6/2004 |
| WO | 02/50664 A2 | 6/2002 |
| WO | 02/052404 A2 | 7/2002 |

OTHER PUBLICATIONS

Volkmar Uhlig, Joshua LeVasseur, Espen Skoglund, Uwe Dannowski, System Architecture Group, Universitat Karlsruhe, "Towards Scalable Multiprocessor Virtual Machines", USENIX Association, Proceedings of the Third Virtual Machine Research and Technology Symposium, San Jose, CA, USA, May 6, 2004, - May 7, 2004, pp. 43-56, XP002452736, URL:usenix.org/events/vm04/tech/full_papers/uhlig/uhlig.pdf - p. 46, p. 48.

Samuel T. King, Peter M. Chen, Department of Electrical Engineering and Computer Science, University of Michigan, Ann Arbor, MI 48109-2122, "Backtracking Intrusions", SOSP '03, Oct. 19-22, 2003, Bolton Landing, New York, USA, Copyright 2003, ACM 1-58113-757-5/03/0010, 14 pages.

* cited by examiner

*Primary Examiner*—Lewis A Bullock, Jr.
*Assistant Examiner*—Camquy Truong
(74) *Attorney, Agent, or Firm*—Kenyon & Kenyon LLP

(57) ABSTRACT

A system and method for allowing a virtual machine monitor to assume control of a system when the current privilege level of guest software meets a privilege level exiting criteria. The processor detects that the current privilege level meets the criteria and then transfers control from the guest software to the virtual machine monitor. The virtual machine monitor may decline to assume control for certain privilege level changes or values.

53 Claims, 8 Drawing Sheets

SUPPORT FOR TRANSITIONING TO A VIRTUAL MACHINE MONITOR BASED UPON THE PRIVILEGE LEVEL OF GUEST SOFTWARE

BACKGROUND OF THE INVENTION

Embodiments of the invention pertain to virtual machines. More particularly, embodiments of the invention pertains to allowing a virtual machine monitor (VMM) to recapture control of a processor when the privilege level of guest software running in a virtual machine (VM) meets a privilege level exiting criteria.

A conventional VMM may run on a computer and presents to other software the abstraction of one or more virtual machines. Each VM may function as a self-contained platform, running its own operating system (OS), such as a "guest operating system", and applications, collectively known as the "guest software." The guest software is said to be running in or on a VM. The guest software expects to operate as if it were running on a dedicated computer rather than a VM. That is, the guest software expects to control various computer operations and have access to hardware resources during these operations. The hardware resources may include processor-resident resources, such as control registers, and resources that reside in memory, such as descriptor tables. However, in a virtual-machine environment, the VMM should be able to have ultimate control over these resources to provide proper operation of VMs and protection from and between VMs. To achieve this, the VMM typically intercepts and arbitrates all accesses made by the guest software to the hardware resources.

Most instruction set architectures (ISAs) define multiple privilege levels to isolate less-privileged applications from more privileged operating system functionality. For example, one prior art 32-bit architecture has four privilege levels, referred to as ring 0 through ring 3, with ring 0 being the most privileged and ring 3 being the least privileged. The processor provides controlled ways to switch between the different privilege levels. Switches may be explicit by invoking a special instruction or implicit by raising an exception or fault, or by an external event such as an interrupt. For example, a privilege level change may occur during execution of an instruction, such as a call (CALL), a software interrupt (INT), or an interrupt return (IRET). A privilege level change may also occur as a result of other synchronous or asynchronous events such as, for example, exceptions, external interrupts, faults, task switches, traps, and other similar events.

Operating systems for multi-processor or multi-threaded systems protect data that might be accessed simultaneously from more than one thread or processor with software implemented locks ensuring mutual exclusion. In cases where locks are usually held for a short time, so-called spin locks may be used. When software operating on one processor or thread attempts to acquire a lock that is already taken by software operating on another processor or thread, the software attempts to reacquire the lock in a tight code loop. While running in this tight loop the software does not perform any useful work and the hardware processor thread provides no benefit. On multi-threaded processors or multiple processor systems, the execution of one thread or processor may take away resources of the other threads or processors, such as consuming bandwidth, execution units, or power. Therefore, the spinning period should be as short as possible.

VMMs virtualizing multi-processor or multi-threaded systems may execute the software running on each instance of guest software in a separate VM, or virtual processor (VP). On a non-VM system, these instances of guest software would execute on a distinct processor or thread. Collectively the VPs and all instances of the guest software are referred to as a virtual system. Such a VMM may experience significant degradation when not taking this guest locking behavior into account. Hence, the VMM should not preempt a VP while that VP holds a lock unless it preempts all VPs for that virtual system. Since locking primitives cannot be directly detected by hardware when locks are implemented by software, heuristics or indirect observation techniques may be used.

One such heuristic is based on common OS behavior. While an OS is not executing in privileged mode or while it is in a low-power state, the OS likely holds no locks. A VMM may take advantage of that knowledge by only preempting a virtual processor which is executing in an unprivileged mode or is in a low power state. Preemptions of guest software executing in privileged mode is deferred until the guest software switches to unprivileged mode.

DETAILED DESCRIPTION

Figure 1:
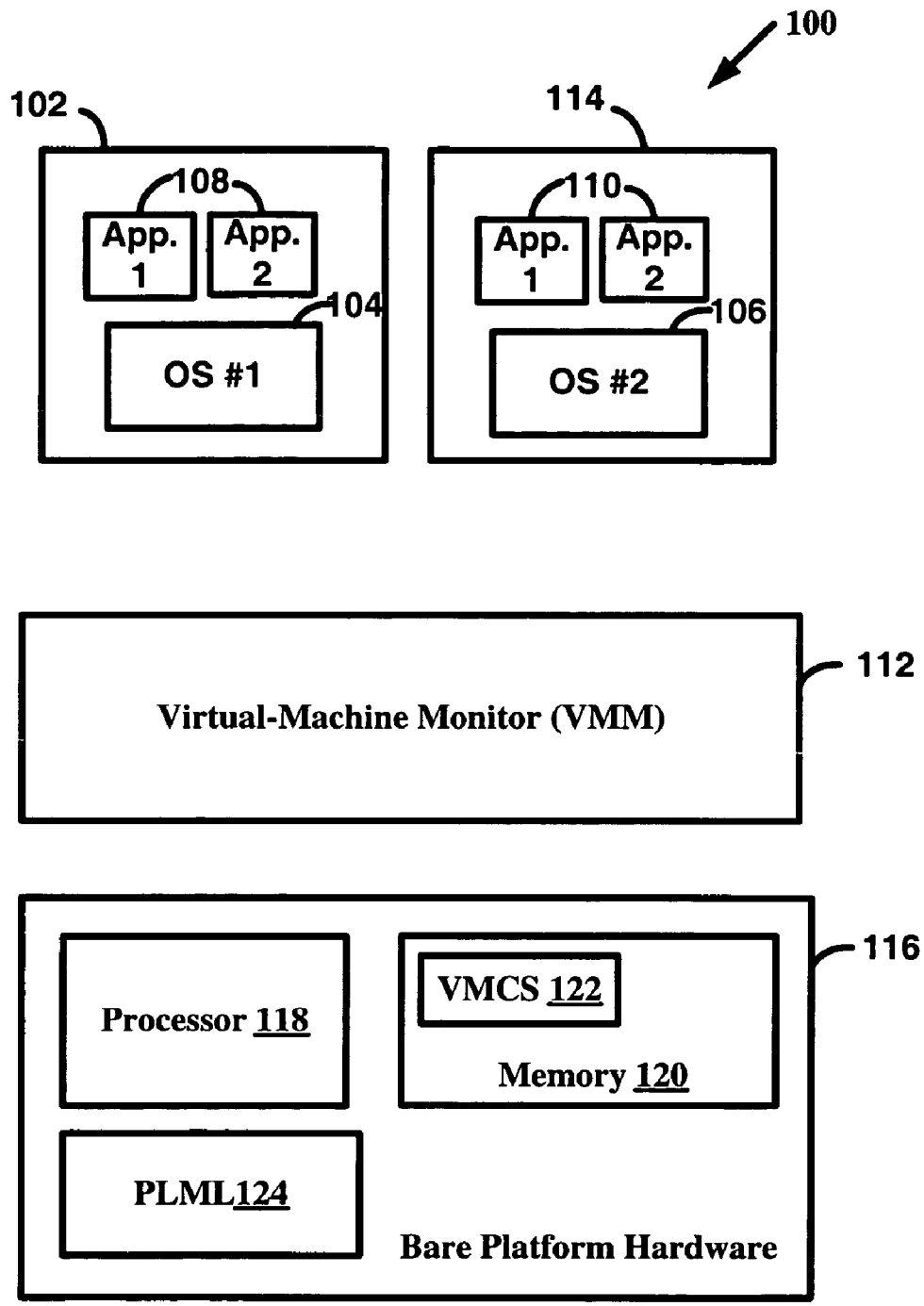
FIG. 1 illustrates in a block diagram one embodiment of a processing system on which an embodiment of the present invention may be implemented.

A system and method are provided for allowing a virtual machine monitor (VMM) to assume control of a system when the privilege level of guest software executing in a virtual machine (VM) meets certain privilege level exiting criteria. The processor detects that the privilege level of guest software meets the criteria, then transitions control to the VMM. The privilege level exiting criteria may include an increase in privilege level, a decrease in privilege level, any change in privilege level, a privilege level matching a predetermined level, a privilege level greater than a predetermined level, a privilege level less than a predetermined level, or a specific transition in privilege level. The VMM may decline to assume control for certain privilege level values or changes in value. The transition to the VMM may occur before or after executing any instructions in the VM.

Embodiments of the present invention also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), erasable programmable read only memories (EPROMs), electronically erasable programmable read only memories (EEPROMs), magnetic or optical cards, or any type of media suitable for storing electronic instructions, and each coupled to a computer system bus. Instructions are executable using one or more processing devices (e.g., central processing units, etc.). In other embodiments, steps of the present invention might be performed by specific hardware components that contain reconfigurable or hardwired logic for performing the steps, or by any combination of programmed computer components and custom hardware components.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

FIG. 1 illustrates one embodiment of a virtual-machine environment 100, in which the present invention may operate. Different embodiments of the present invention may be performed by the VM environment of FIG. 1, as well as by processing logic that may comprise hardware, software, or a combination of both. In this embodiment, bare platform hardware 116 comprises a computing platform, which may be capable, for example, of executing a standard operating system (OS) or a VMM 112.

A VMM 112, though typically implemented in software, may export a bare machine interface to higher level software. Such higher level software may comprise a standard or real-time OS, although the invention is not limited in scope in this respect. Additionally, for example, a VMM may be run within, or on top of, another VMM. VMMs and their typical features and functionality are well-known by those skilled in the art and may be implemented, for example, in software, firmware or by a combination of various techniques.

The platform hardware 116 can be a personal computer (PC), mainframe, handheld device, portable computer, set-top box, or any other computing system. The platform hardware 116 includes a processor 118, memory 120 and privilege level monitoring logic 124.

Processor 118 can be any type of processor capable of executing software, such as a microprocessor, digital signal processor, microcontroller, or the like. The processor 118 may include microcode, reconfigurable logic, programmable logic or hardcoded logic for performing the execution of method embodiments of the present invention. Though FIG. 1 shows only one such processor 118, there may be one or more processors in the system.

Memory 120 can be a hard disk, a floppy disk, random access memory (RAM), read only memory (ROM), flash memory, any combination of the above devices, or any other type of machine medium readable by processor 118. Memory 120 may store instructions and/or data for performing the execution of method embodiments of the present invention.

The VMM 112 presents to other software (e.g., "guest" software) the abstraction of one or more virtual machines (VMs), which may provide the same or different abstractions to the various guests. One or more VMs may be present in the system. For example, FIG. 1 shows two VMs, 102 and 114. The guest software running on each VM may include a guest OS such as a guest OS 104 or 106 and various guest software applications 108 and 110. Guest software running in the VMs 102 and 114 expects to access physical resources (e.g., processor registers, memory and I/O devices) within the VMs 102 and 114 on which the guest software is running and to handle various events including interrupts generated by system devices, exceptions, and the like. In a virtual-machine environment, the VMM 112 should be able to have ultimate control over the physical resources to provide proper operation of VMs 102 and 114 and protection from and between VMs 102 and 114. The VMM 112 achieves this goal by intercepting accesses of the guest software to the computer's physical resources as necessary.

The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

Further, each guest OS 104 and 106 expects to handle various fault events such as exceptions (e.g., page faults, general protection faults, traps, aborts, etc.), interrupts (e.g., hardware interrupts, software interrupts), and platform events (e.g., initialization (INIT) and system management interrupts (SMIs)). Some of these fault events are "privileged" because they must be handled by the VMM 112 to ensure proper operation of and protection from and among the VMs 102 and 114.

When a privileged fault event occurs or guest software attempts to access a privileged resource, control may be transferred to the VMM 112. The transfer of control from guest software to the VMM 112 is referred to herein as a VM exit. After receiving control following the VM exit, the VMM 112 may perform a variety of processing, after which it may return control to guest software. The transfer of control from the VMM to guest software is referred to herein as a VM entry.

To invoke privileged OS functionality, applications use special instructions, such as INT or SYSTENTER. The system call identifier and parameters are usually loaded into registers of the processor before invoking the operation. Intercepting system calls allows for multiple usage scenarios. For example, by tracking system calls, an intrusion detection system may derive the origin of a security breach. Another usage scenario is to derive scheduling patterns for periodic real-time tasks by detecting periods of execution based on the temporal pattern of system call invocations.

In one embodiment, the processor 118 controls the operation of the VMs 102 and 114 in accordance with data stored in a VM control structure (VMCS) 122. In one embodiment, the VMCS 122 is stored in memory 120. In another embodiment, the VMCS 122 is stored in the processor 118. In some embodiments, multiple VMCS structures are used to support multiple VMs.

The VMCS 122 is a structure that may contain the state of guest software, the state of the VMM 112, execution control information indicating how the VMM 112 wishes to limit or otherwise control operation of guest software and other information. Transitions to and from the guest software and the operation of the guest software in the VM are controlled using a group of VM controls stored in the VMCS. Execution controls specify circumstances under which control must be transferred from the guest software to the VMM. Exit controls control the saving of a guest state and the loading of VMM state at VM exit. Information describing the most recent VM exit is provided in a group of VM exit information data fields. When a VM exit occurs, components of the processor state used by guest software are saved to the VMCS 122, and components of the processor state required by the VMM 112 are loaded from the VMCS 122. Entry controls control the saving of the VMM state and the loading of guest state at VM entry. When a VM entry occurs, the guest state is restored using data stored in the VMCS 122, and control is returned to guest software.

In one embodiment, the processor 118 includes privilege level monitoring logic (PLML) 124 that is responsible for assessing the current privilege level of the guest to determine if a VM exit should be generated based on privilege level exiting criteria specified by the VMM 112. In an embodiment, this privilege level exiting criteria is stored in the VMCS 122. Specific embodiments of said privilege level exiting criteria are described below. If the PLML 124 determines that the current guest privilege level meets the privilege level exiting criteria, processing logic facilitates a VM exit from the guest software to the VMM 112.

In various ISAs, privilege levels may be assigned a numeric value, with a higher numeric value indicating increased privilege, while a lower numeric value indicates reduced privilege. In other embodiments, a higher numeric value may indicate reduced privileges. In the discussions herein, when privilege levels are referred to as "increasing" it means that the guest software is becoming more privileged and "decreasing" means becoming less privileged, regardless of the numeric values involved. Likewise, a privilege level that is "less than" another privilege level is one with reduced privileges, regardless of the numeric values of involved.

Controls may be added to the VM controls to express the privilege level exiting criteria. In one embodiment, a privilege level increase exiting control, if set to an enabled value, indicates that VM exits should be generated when an increase of privilege level occurs during operation of the guest software. This control determines if the delivery of an event or execution of an instruction that increases the privilege level should cause a VM exit. In one embodiment, the VM exit due to such an increase in privilege level occurs following the completion of execution (i.e. after retirement) of the instruction that caused the privilege level change. The guest instruction pointer value, which may, in an embodiment, be reported to the VMM as part of the VM exit information, may point to the first instruction to be executed in the new privilege level. In one embodiment, no explicit provision is made to report the address of the instruction that caused the privilege level change.

In another embodiment, a privilege level decrease exiting control, if set to an enabled value, indicates that VM exits should be generated when a decrease of privilege level occurs during operation of the guest software. This control determines if events or instructions that decrease the privilege level should cause a VM exit. In one embodiment, the VM exit due to such a decrease in privilege level occurs following the completion of execution (i.e. after retirement) of the instruction that caused the privilege level change. The guest instruction pointer value, which may be reported to the VMM as part of the VM exit information, may point to the first instruction to be executed in the new privilege level. In one embodiment, no explicit provision is made to report the address of the instruction that caused the privilege level change.

Figure 2:
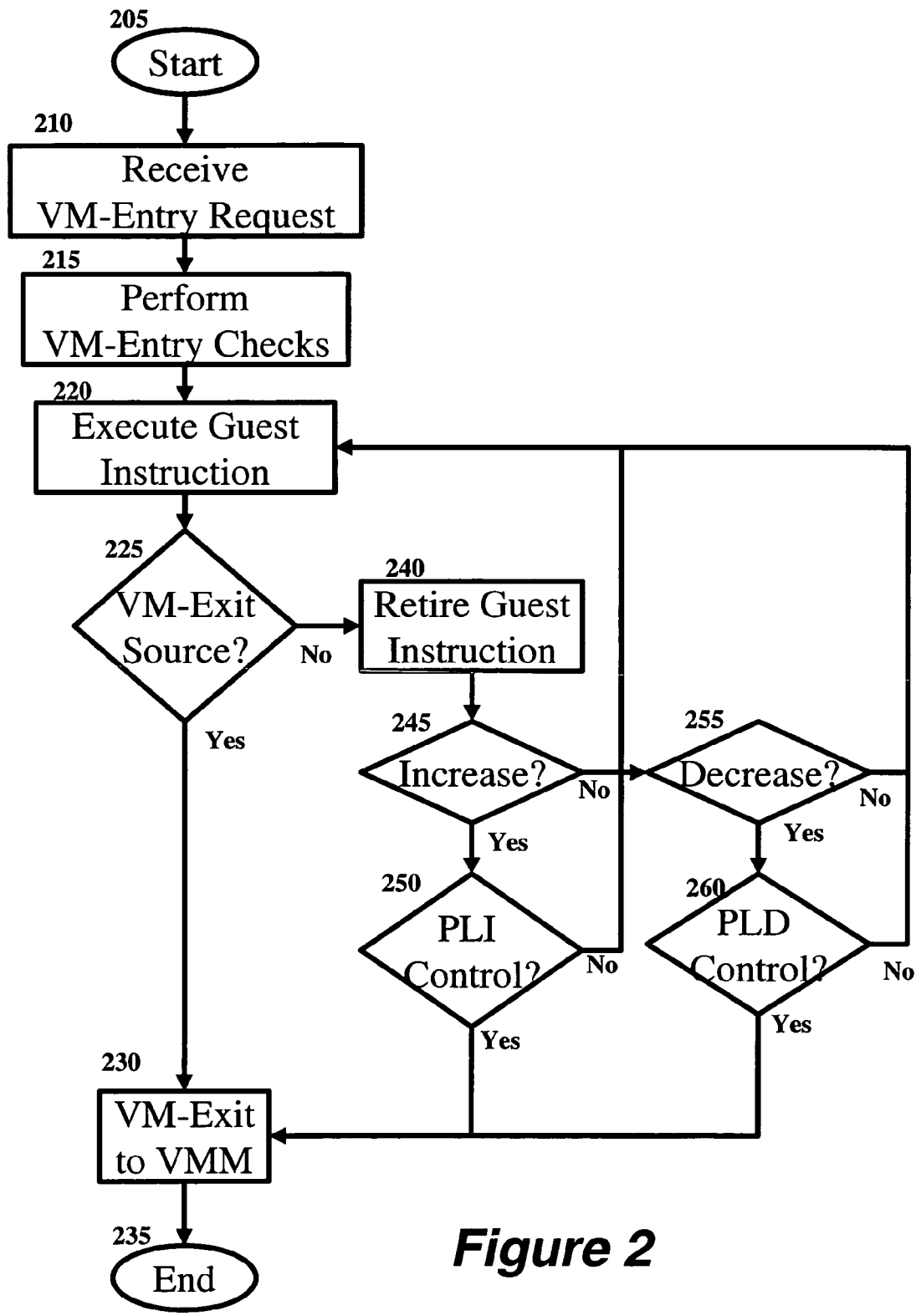
FIG. 2 illustrates in a flowchart a process for privilege level exit control with separate controls for increase and decrease of privilege level according to an embodiment of the present invention.

One embodiment of a method of supporting privilege level increasing and privilege level decreasing controls is shown in the flowchart FIG. 2. FIG. 2 depicts the testing of the privilege level increase and privilege level decrease exiting controls upon a change in guest privilege level. In FIG. 2, VM exits resulting from a change in privilege level are prioritized above other VM exit sources. This is done to simplify the figure; in reality, some other VM exit sources may be higher in priority and some may be lower. In the embodiment depicted in FIG. 2, while both privilege level increasing and privilege level decreasing controls are shown, the controls may be supported independently or in conjunction with other privilege level exiting controls described herein in different embodiments.

In FIG. 2, the process begins (Block 205) when a VM entry request is received from the VMM 112 (Block 210). VM entry checks are performed, such as loading the state of the system and others (Block 215). A guest instruction is executed (Block 220). If the execution of the instruction causes a VM exit (Block 225), the VM exit causes control to transition to the VMM 112 and reports to the VMM 112 the cause of the VM exit (Block 230), ending the process (Block 235). If VM exit does not occur during the execution of the instruction (Block 225), then the guest instruction is retired (Block 240). After evaluating the current privilege level of the guest software, if the privilege level of the guest software has been determined to have increased (Block 245), and a privilege level increase (PLI) control is enabled (Block 250), then the VM exit causes control to transition to the VMM 112 and reports to the VMM 112 that the VM exit was caused by the PLI (Block 230). If the privilege level of the guest software has been determined to have increased (Block 245), and a privilege level increase (PLI) control is not enabled (Block 250), then processing logic executes the next guest instruction (Block 220).

If the privilege level of the guest software has not been determined to have increased (Block 245), then the processing logic checks for a privilege level decrease (PLD). After evaluating the current privilege level of the guest software, if the privilege level of the guest software has been determined to have decreased (Block 245), and a PLD control is enabled (Block 250), then the VM exit causes control to transition to the VMM 112 and reports to the VMM 112 that the VM exit was caused by the PLD (Block 230). If the privilege level of the guest software has not been determined to have decreased (Block 255) or a PLD control is not enabled (Block 260), then the next guest instruction is executed (Block 220).

The privilege level exit criteria may be enabled and disabled to allow for selective exiting, which may be particularly valuable for multiprocessor scheduling, since the VM exits due to privilege level changes are usually required only occasionally. Additionally, for example, the VMM may only react to transitions from the OS kernel to the user-level code in the VM.

Figure 3:
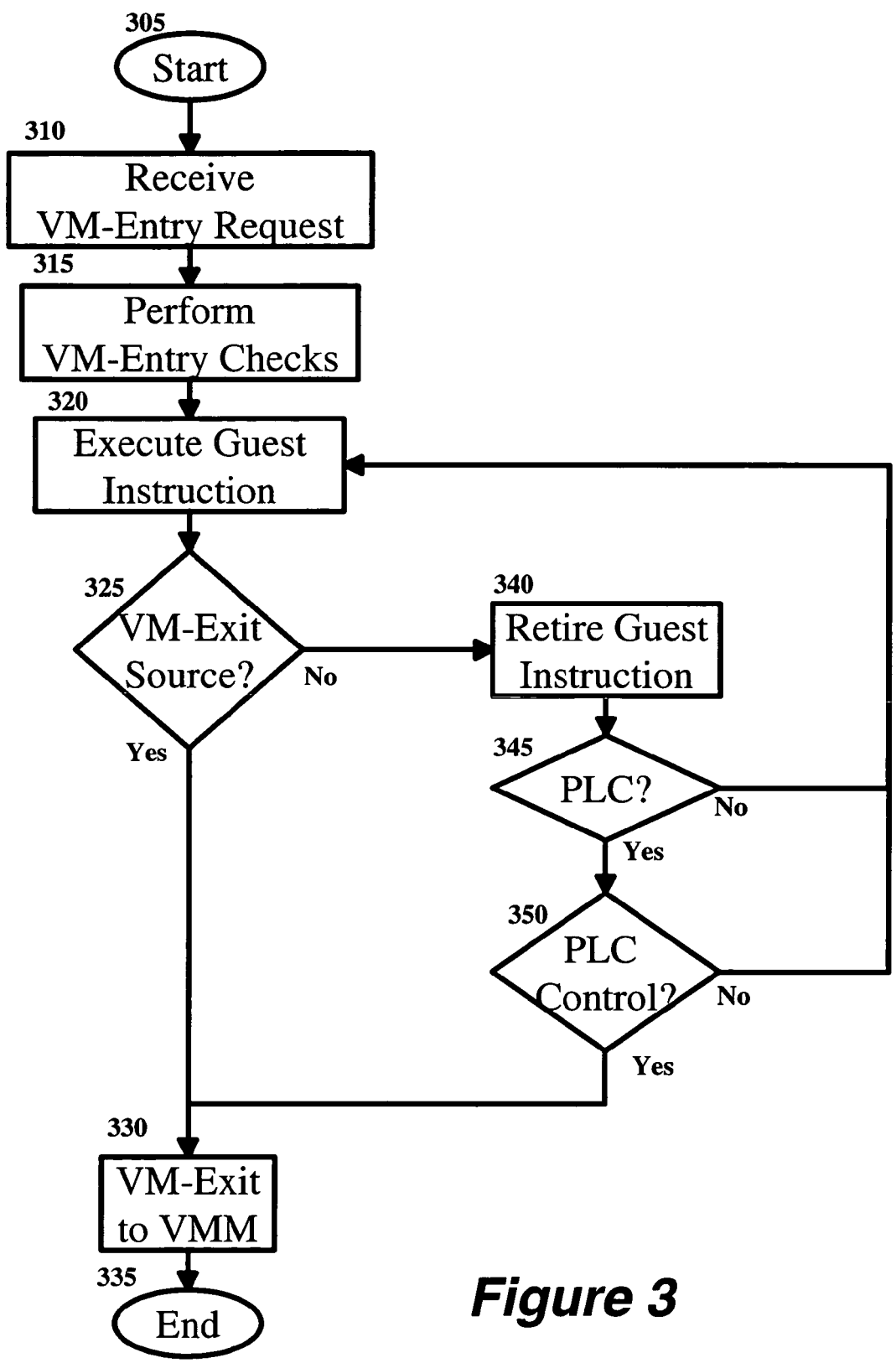
FIG. 3 illustrates in a flowchart a process for privilege level exit control with combined controls for increase and decrease of privilege level according to an embodiment of the present invention.

In an alternative embodiment, the functionality provided by the privilege level increasing and privilege level decreasing execution controls described above may be combined into a single privilege level change exiting control which specifies that any change in privilege level will cause a VM exit, as shown in FIG. 3. In FIG. 3, the process begins (Block 305) when a VM entry request is received from the VMM 112 (Block 310). VM entry checks are performed, such as loading the state of the system and others (Block 315). A guest instruction is executed (Block 320). If the execution of the instruction causes a VM exit (Block 325), the VM exit causes control to transition to the VMM 112 and reports to the VMM 112 the cause of the VM exit (Block 330), ending the process (Block 335). If no VM exit occurs during the execution of the instruction (Block 325), then the guest instruction is retired (Block 340). After evaluating the current privilege level of the guest software, if the privilege level of the guest software has been determined to have changed (Block 345), and a privilege level change (PLC) exiting control is enabled (Block 350), then the VM exit causes control to transition to the VMM 112 and reports to the VMM 112 that the VM exit was caused by the PLC (Block 330). If a PLC condition is not satisfied (Block 345) or the PLC exiting control is not enabled (Block 350), then the next guest instruction is executed (Block 320).

Figure 4:
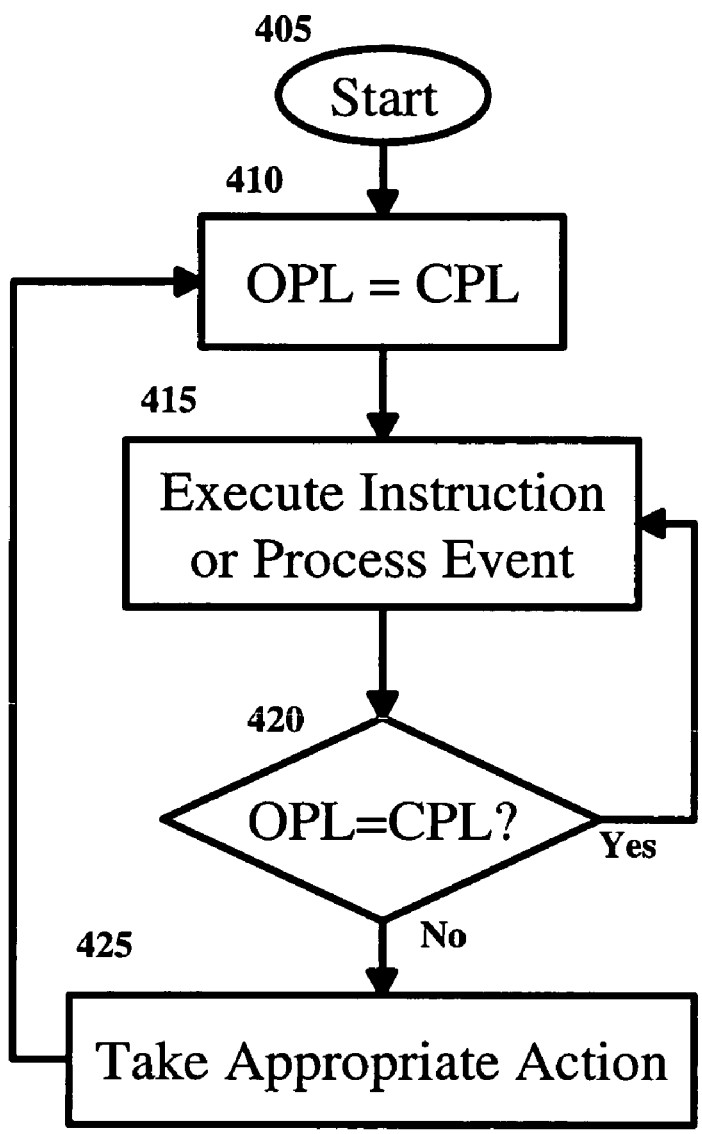
FIG. 4 illustrates in a flowchart a process for detecting change in privilege level according to an embodiment of the present invention.

FIG. 4 illustrates in a flowchart one method for detecting changes in privilege level according to one embodiment of the invention. In this figure, the process begins (Block 405) by initializing a variable representing the old privilege level (OPL) by setting it to the current privilege level (CPL) (Block 410). A single instruction or a single asynchronous event, such as an interrupt, is processed or executed (Block 415). After the instruction execution or event processing (Block 415), if the privilege level is different than before the instruction or event processing (Block 420), the privilege level has changed and an action is taken (Block 425), as shown in FIG. 2 and FIG. 3. Otherwise, the next instruction or process event is executed (Block 415).

Note that in FIG. 2 and FIG. 3, an evaluation occurs after the execution of the instruction, but before the retirement of the instruction, to determine if a VM exit should occur. In fact, this evaluation may occur as part of the attempted execution of an instruction. For example, accessing a control register (e.g., CR0) may cause a VM exit having faulting semantics. In other words, the VM exit occurs before any architectural state is modified by the instruction. Other VM exits may occur following the modification of some architectural state, but before retirement of the instruction, such as instructions that cause tasks switches that in turn cause VM exits. Some VM exits may occur following the retirement of an instruction. The evaluation of privilege level may be one such condition that is evaluated post-retirement. Other VM exits may occur for other reasons and under other circumstances.

Figure 5:
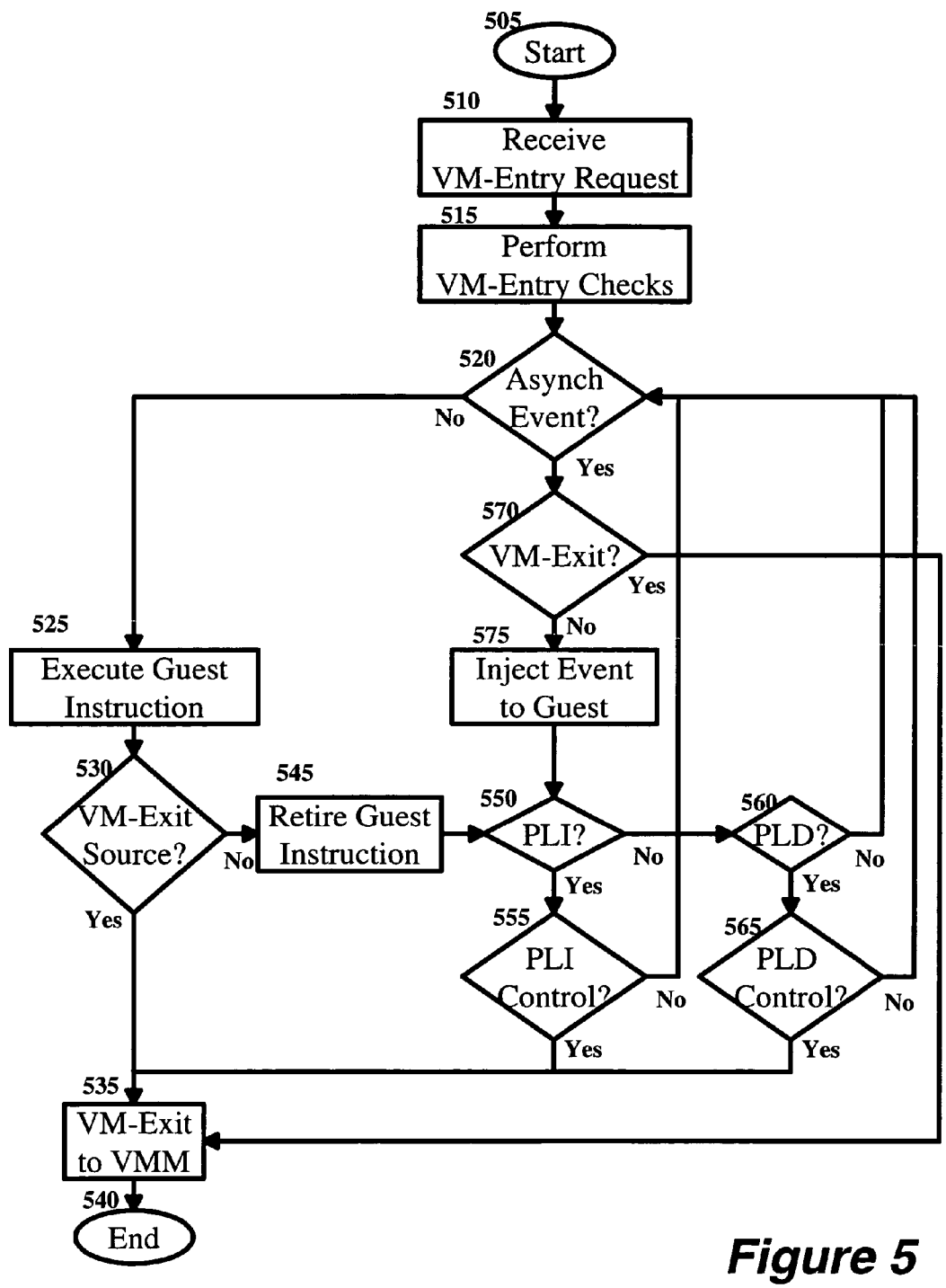
FIG. 5 illustrates in a flowchart a process for asynchronous event handling according to an embodiment of the present invention.

FIG. 5 illustrates in a flowchart a method that recognizes both synchronous events, such as the execution of a privilege level changing instruction, and asynchronous events, such as the arrival of an interrupt during the execution of guest software. In FIG. 5, the process begins (Block 505) when a VM entry request is received from the VMM 112 (Block 510). VM entry checks are performed, such as loading the state of the system and others (Block 515). If an asynchronous event is not pending (Block 520), a guest instruction is executed (Block 525). If execution of the instruction (Block 525) causes a VM exit (Block 530), the VM exit causes control to transition to the VMM 112 and reports to the VMM 112 the cause of the VM exit (Block 535), ending the process (Block 540). If execution of the instruction does not cause a VM exit (Block 530), then the guest instruction is retired (Block 545). If a privilege level increase (PLI) condition is satisfied (Block 550) and a PLI control is enabled (Block 555), then the VM exit causes control to transition to the VMM 112 and reports to the VMM 112 that the VM exit was caused by the PLI (Block 535). If a PLI condition is not satisfied (Block 550) or a PLI control is not enabled (Block 555), then the processing logic checks for a privilege level decrease (PLD). If a PLD condition is satisfied (Block 560) and a PLD control is enabled (Block 565), then the VM exit causes control to transition to the VMM 112 and reports to the VMM 112 that the VM exit was caused by the PLD (Block 535). If a PLD condition is not satisfied (Block 560) or a PLD control is not enabled (Block 565), then the processing logic checks to see if an asynchonous event is pending at this point (Block 520). If an asynchronous event is pending (Block 520) and the event causes a VM exit (Block 570), the VM exit causes control to transition to the VMM 112 and repots to the VMM 112 that the VM exit was caused by the event (Block 535). If an asynchronous event is pending (Block 520) and the event does not cause a VM exit (Block 570), the event is injected into the guest software (Block 575) and the above mentioned privilege level checks are performed.

In another embodiment, an execution control indicates a privilege level target value. The privilege level target value may be stored in the VMCS under control of the VMM. The VMM may set the privilege level target value to any valid privilege level. In another embodiment, the privilege level target value may have a fixed value. Some embodiments may provide more than one such privilege level target value. For example, one embodiment may have two different privilege level target values, each fixed to a specific value.

In one embodiment, the privilege level target value has no effect until enabled. A privilege level target value control may be enabled by setting a match privilege level target enable control in the VMCS to an enabled value, such as 1. This control indicates that a VM exit should be generated if, during execution of the guest software, the privilege level of the guest software matches this privilege level target value. The execution control may have a plurality of privilege level target values and a plurality of match target privilege enable controls, each corresponding to one of the privilege level target value controls.

In one embodiment, the VM exit due to such a match of the current privilege level with the privilege level target value may occur before the execution of the first instruction to be executed in the matching privilege level. The guest instruction pointer value, which may, in an embodiment, be reported to the VMM as part of the VM exit information, points to the first instruction to be executed in the matching privilege level. In one embodiment, no explicit provision is made to report the address of the instruction that caused the privilege level to change to the matching value.

Figure 6:
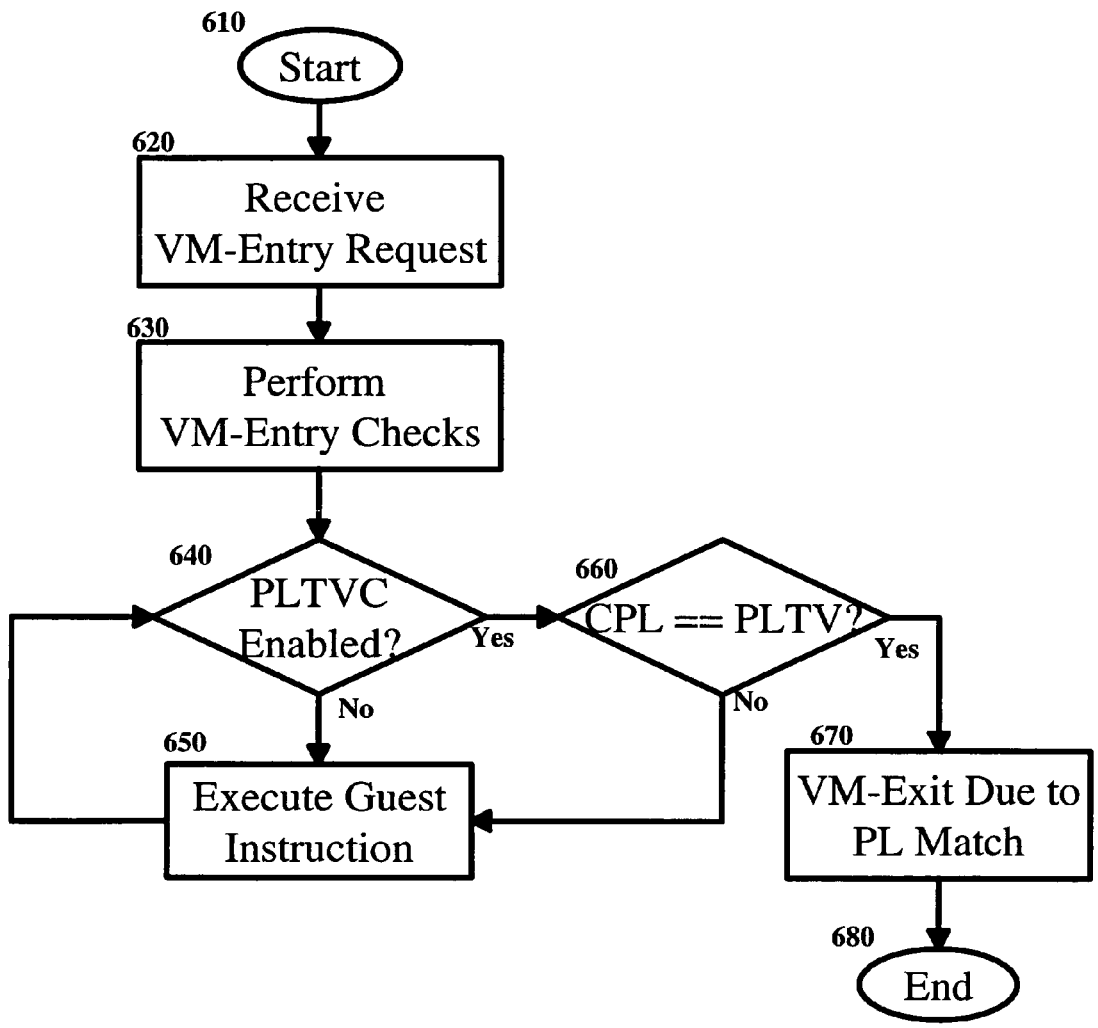
FIG. 6 illustrates in a flowchart one embodiment of a process for transitioning to a virtual machine monitor from guest software based on the privilege level of guest software in a virtual machine environment.

FIG. 6 is a flow diagram of an embodiment of a process for transitioning to a VMM from guest software based on the privilege level of guest software in a virtual machine environment. In the embodiment depicted, a VM exit occurs based on the privilege level of the guest software and the value of a privilege level target value control (PLTVC). In FIG. 6, the process begins (Block 610) when a VM entry request is received from the VMM 112 (Block 620). VM entry checks are performed, such as loading the state of the system and others (Block 630). If a PLTVC is not enabled (Block 640), then a guest instruction is executed (Block 650). After evaluating the current privilege level (CPL) of the guest software, if the PLTVC is enabled (Block 640), and the CPL equals the privilege level target value (PLTV) (Block 660), then the VM exit causes control to transition to the VMM 112 (Block 670), ending the process (Block 680). If the CPL does not equals the PLTV (Block 660), then a guest instruction is executed (Block 650).

In another embodiment, the privilege level target value control is augmented with a privilege level ceiling value control. If this control is set to an enabled value (e.g., set to 1), it indicates that a VM exit should be generated if, during execution of the guest software, the privilege level of the guest software is greater than the privilege level target value. In one embodiment, the execution control may have a plurality of privilege level target values and corresponding privilege level ceiling value controls. In an alternative embodiment, if the privilege level target value is set to the highest privilege level, no transition to a more privileged state may occur and the control is therefore effectively disabled without the use of an enabling control.

In yet another embodiment, the privilege level target execution control is augmented with a privilege level floor value control which indicates that a VM exit should be generated if, during execution of the guest software, the privilege level of the guest software is less than the privilege level target value. In one embodiment, the execution control may have a plurality of privilege level target values and corresponding privilege level floor value controls. In an alternative embodiment, if the privilege level target value is set to the lowest privilege level, no transition to a less privileged state may occur and the control is therefore effectively disabled without the use of an enabling control.

Figure 7:
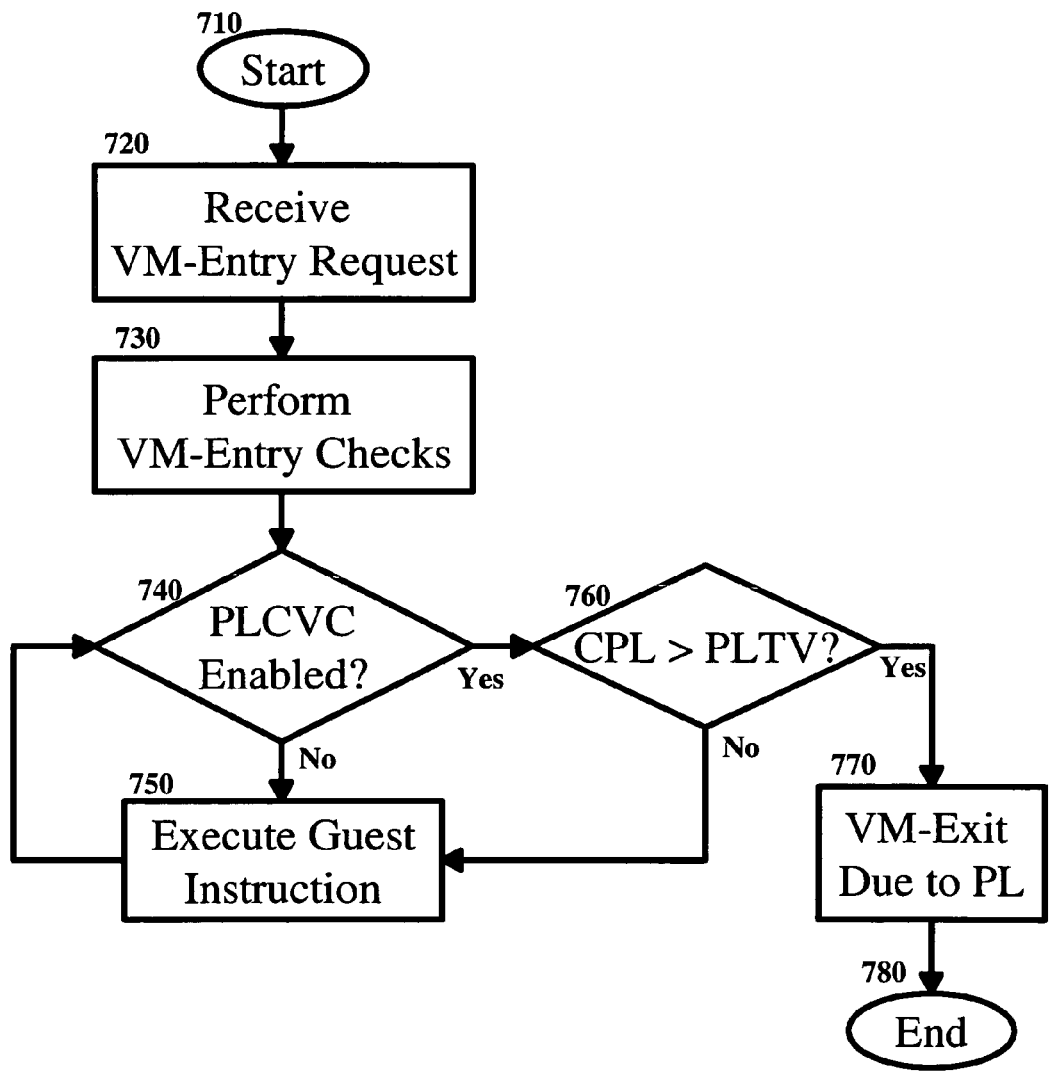
FIG. 7 illustrates in a flowchart one embodiment of a process for transitioning to a virtual machine monitor from guest software based on the privilege level of guest software in a virtual machine environment.

FIG. 7 is a flow diagram of an embodiment of a process for transitioning to a VMM from guest software based on the privilege level of guest software in a virtual machine environment. In the embodiment depicted, a VM exit occurs based on the privilege level of the guest software and the value of a privilege level ceiling value control (PLCVC) when the current privilege level is greater than the PLTV. In FIG. 7, the process begins (Block 710) when a VM entry request is received from the VMM 112 (Block 720). VM entry checks are performed, such as loading the state of the system and others (Block 730). If a PLCVC is not enabled (Block 740), then a guest instruction is executed (Block 750). After evaluating the CPL of the guest software, if the PLCVC is enabled (Block 740), and the CPL exceeds the PLTV (Block 760), then the VM exit causes control to transition to the VMM 112 (Block 770), ending the process (Block 780). If the CPL does not exceed the PLTV (Block 760), then a guest instruction is executed (Block 750).

Figure 8:
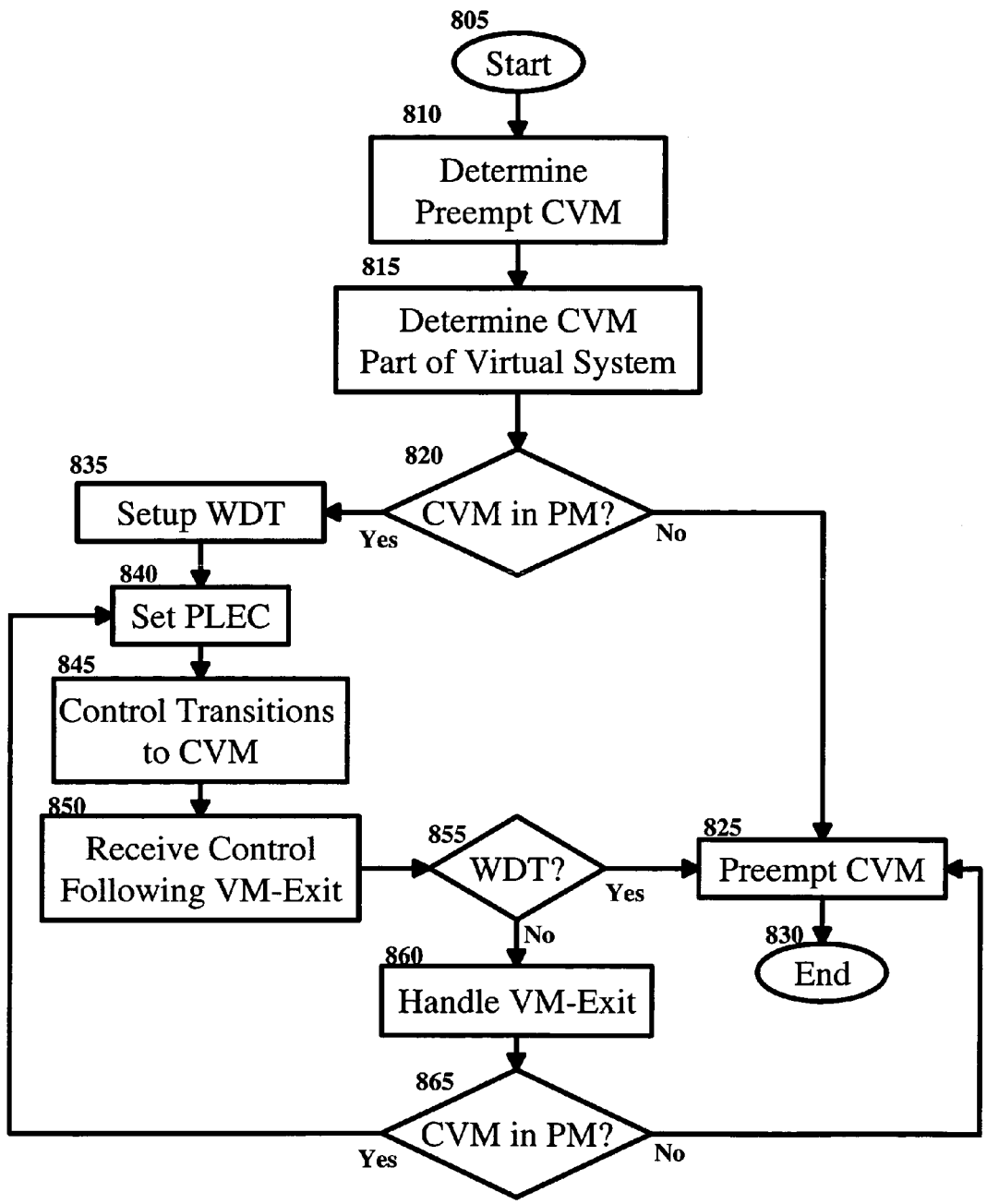
FIG. 8 illustrates in a flowchart one embodiment of a process for performing preemptive scheduling in a virtual-machine environment.

In practice, use of a watchdog timer may be required because at times operating systems remain in kernel mode for extended periods of time running multiple driver threads. FIG. 8 is a flow diagram of one embodiment of a process for performing preemptive scheduling in a virtual-machine environment. In FIG. 8, the process begins (Block 805) when the processing logic determines if the current VM (CVM) needs to be preempted (Block 810). The processing logic determines if the CVM is part of a virtual system (Block 815). If the CVM is not in a privileged mode (PM) (Block 820), then the CVM is preempted (Block 825), ending the process (Block 830). If the CVM is in a PM (Block 820), then a watch dog timer (WDT) is set up (Block 835). The privilege level exiting control (PLEC) is then set appropriately to cause VM exits when the CVM is not in privileged mode (Block 840). Next, processing logic transitions control to the CVM (Block 845). The VMM 112 received control following a VM exit from the CVM (Block 850). If the VM exit was due to a WDT (Block 855), then the CVM is preempted (Block 825), ending the process (Block 830). If the VM exit was not due to a WDT (Block 855), the VM exit is handled (Block 860), and the processing logic determines if the CVM is not in a PM (Block 865). If the CVM is not in a PM (Block 865), then the CVM is preempted (Block 825), ending the process (Block 830). If the CVM is in a PM (Block 865), the PLEC is set (Block 840) and control transitions to the CVM (Block 845), the WDT and PLEC remain in effect.

In an alternative embodiment, controls are provided to cause VM exits on specific transitions between privilege levels, such as from a first level to a fourth and from a third level to a second. For example, in an ISA with 4 privilege levels, there may be 12 controls provided to allow the VMM to select any of the 12 possible combinations of source and destination privilege levels to cause VM exits. In one embodiment, controls for less than the full cross product of privilege level combinations may be provided. The controls are referred to herein as privilege level source destination exiting controls (PLSDEC).

In one embodiment, execution controls are provided for all events and instructions which may cause transitions in privilege level, allowing a VMM 112 to regain control on all such changes in privilege level. This alternative may require additional support in the VMM 112 to determine if a particular instruction execution actually causes a privilege level change. For example, in one ISA, an interrupt return instruction (IRET) may cause a change in privilege level, but not in all cases. If the execution of an IRET instruction causes a VM exit unconditionally, without regard to whether the execution of the instruction would change privilege level, the VMM may need to emulate or otherwise single step the instruction to determine if it causes a privilege level change. Additional demands may be placed on the VMM software, such as emulating the IRET, to determine if the faulting instruction would have caused the awaited privilege level change.

Some operations or events that cause privilege level changes may cause VM exits due to other reasons. These other VM exit causes may be higher in priority or evaluated before the evaluation of privilege level exiting criteria following the execution of such an instruction. In this case, the VMM may determine that the VM exit-causing event or instruction would also cause a change in privilege level. For example, a virtualization architecture may allow a VMM to set an execution control to cause VM exits on execution of software (SW) interrupt instructions. The execution of a SW interrupt instruction, in user-level code, may cause a change in privilege level. Execution controls may be configured to cause VM exits when SW interrupt instructions are executed at the same time that changes in privilege level are set to cause VM exits. When this occurs, the SW interrupt-caused VM exit may be evaluated first, during execution of the SW interrupt instruction, thus causing a VM exit prior to the change in privilege level. In this case, the SW interrupt exiting condition is faulting in nature and is evaluated prior to the completion of the execution of the instruction, while the privilege level change is trapping in nature and is evaluated following completion of the instruction. In one embodiment, multiple VM exit sources may be trapping in nature and multiple VM exit sources may be faulting in nature. The evaluation of privilege level exiting criteria may be of higher or lower priority than any or all other VM exit sources.

In the above description, for purposes of explanation, numerous specific details are set forth in order to provide a thorough understanding of the present invention. It will be apparent, however, to one skilled in the art that the present invention can be practiced without these specific details.

What is claimed is:

1. A method, implemented by a processor executing instructions stored on a computer memory device, said method comprising:
   determining an initial privilege level of a guest software;
   evaluating a current privilege level of a the guest software executing in a virtual machine; and
   transitioning control to a virtual machine monitor if the current privilege level meets a privilege level exiting criteria, wherein the privilege level exit criteria is enabled and disabled to allow for selective exiting, wherein determining if the current privilege level meets a privilege level exiting criteria comprises transitioning control to the virtual machine monitor if a privilege level change exiting control is enabled and the current privilege level is different from the initial privilege level.

2. The method of claim 1, further comprising storing the privilege level exiting criteria in a virtual machine control structure.

3. The method of claim 1, further comprising:
transitioning control to the virtual machine monitor if a privilege level increase exiting control is enabled and the current privilege level is more privileged than the initial privilege level.

4. The method of claim 1, further comprising:
transitioning control to the virtual machine monitor a privilege level decrease exiting control is enabled and if the current privilege level is less privileged than the initial privilege level.

5. The method of claim 1, further comprising:
transitioning control to the virtual machine monitor if a privilege level source destination exiting control associated with a transition from the initial privilege level to the current privilege level is enabled.

6. The method of claim 1, further comprising storing a target privilege level.

7. The method of claim 6, further comprising:
transitioning control to the virtual machine monitor if a privilege level match exiting control is enabled and the current privilege level is the same as the target privilege level.

8. The method of claim 6, further comprising:
transitioning control to the virtual machine monitor if a privilege level ceiling exiting control is enabled and the current privilege level is more privileged than the target privilege level.

9. The method of claim 6, further comprising:
transitioning control to the virtual machine monitor if a privilege level floor exiting control is enabled and the current privilege level is less privileged than the target privilege level.

10. The method of claim 6, wherein the target privilege level is variable.

11. The method of claim 6, wherein the target privilege level is fixed.

12. The method of claim 1, further comprising transitioning control to the virtual machine monitor before execution of an instruction in the guest software.

13. The method of claim 1, further comprising transitioning control to the virtual machine monitor after execution of an instruction in the guest software.

14. A set of instructions residing in a storage medium, said set of instructions when executed by a processor to implement a method for processing data, the method comprising:
determining an initial privilege level of a quest software;
evaluating a current privilege level of a the guest software executing in a virtual machine; and
transitioning control to a virtual machine monitor if the current privilege level meets a privilege level exiting criteria, wherein the privilege level exit criteria is enabled and disabled to allow for selective exiting,
wherein determining if a current privilege level meets a privilege level exiting criteria comprises transitioning control to the virtual machine monitor if a privilege level change exiting control is enabled and the current privilege level is different from the initial privilege level.

15. The set of instructions of claim 14, further comprising storing the privilege level exiting criteria in a virtual machine control structure.

16. The set of instructions of claim 14, further comprising:
transitioning control to the virtual machine monitor if a privilege level increase exiting control is enabled and the current privilege level is more privileged than the initial privilege level.

17. The set of instructions of claim 14, further comprising:
transitioning control to the virtual machine monitor if a privilege level decrease exiting control is enabled and if the current privilege level is less privileged than the initial privilege level.

18. The set of instructions of claim 14, further comprising:
transitioning control to the virtual machine monitor if a privilege level source destination exiting control associated with a transition from the initial privilege level to the current privilege level is enabled.

19. The set of instructions of claim 14, further comprising storing a target privilege level.

20. The set of instructions of claim 19, further comprising:
transitioning control to the virtual machine monitor if a privilege level match exiting control is enabled and the current privilege level is the same as the target privilege level.

21. The set of instructions of claim 19, further comprising:
transitioning control to the virtual machine monitor if a privilege level ceiling exiting control is enabled and the current privilege level is more privileged than the target privilege level.

22. The set of instructions of claim 19, further comprising:
transitioning control to the virtual machine monitor if a privilege level floor exiting control is enabled and the current privilege level is less privileged than the target privilege level.

23. The set of instructions of claim 19, wherein the target privilege level is variable.

24. The set of instructions of claim 19, wherein the target privilege level is fixed.

25. The set of instructions of claim 14, further comprising transitioning control to the virtual machine monitor before execution of an instruction in the guest software.

26. The set of instructions of claim 14, further comprising transitioning control to the virtual machine monitor after execution of an instruction in the guest software.

27. A processor comprising:
a memory coupled to the processor to store a first instruction of a quest software;
a first logic to evaluate a current privilege level of a the guest software executing in a virtual machine and to transition control to a virtual machine monitor if the current privilege level meets a privilege level exiting criteria, wherein the privilege level exit criteria is enabled and disabled to allow for selective exiting,
wherein the first logic is to determine an initial privilege level of the quest software and transition control to the virtual machine monitor if a privilege level change exiting control is enabled and the current privilege level is different from the initial privilege level.

28. The processor of claim 27, wherein the first logic is to transition control to the virtual machine monitor if a privilege level increase exiting control is enabled and the current privilege level is more privileged than the initial privilege level.

29. The processor of claim 27, wherein the first logic is to transition control to the virtual machine monitor a privilege level decrease exiting control is enabled and if the current privilege level is less privileged than the initial privilege level.

30. The processor of claim 27, wherein the first logic is to transition control to the virtual machine monitor if a privilege level source destination exiting control associated with a transition from the initial privilege level to the current privilege level is enabled.

31. The processor of claim 27, wherein the first logic is to store a target privilege level and to transition control to the virtual machine monitor if a privilege level match exiting control is enabled and the current privilege level is the same as the target privilege level.

32. The processor of claim 27, wherein the first logic is to store a target privilege level and to transition control to the virtual machine monitor if a privilege level ceiling exiting control is enabled and the current privilege level is more privileged than the target privilege level.

33. The processor of claim 27, wherein the first logic is to store a target privilege level and to transition control to the virtual machine monitor if a privilege level floor exiting control is enabled and the current privilege level is less privileged than the target privilege level.

34. A system comprising:
a processor to implement a virtual machine to execute a guest software;
a memory coupled to the processor to store a first instruction of the guest software; and
the processor to evaluate a current privilege level of a guest software executing in a virtual machine and to transition control to a virtual machine monitor if the current privilege level meets a privilege level exiting criteria, wherein the privilege level exit criteria is enabled and disabled to allow for selective exiting, wherein the processor is to determine an initial privilege level and transition control to the virtual machine monitor if a privilege level change exiting control is enabled and the current privilege level is different from the initial privilege level.

35. The system of claim 34, wherein the memory stores the privilege level exiting criteria in a virtual machine control structure.

36. The system of claim 34, wherein the processor is to transition control to the virtual machine monitor if a privilege level increase exiting control is enabled and the current privilege level is more privileged than the initial privilege level.

37. The system of claim 34, wherein the processor is to transition control to the virtual machine monitor a privilege level decrease exiting control is enabled and if the current privilege level is less privileged than the initial privilege level.

38. The system of claim 34, wherein the processor is to transition control to the virtual machine monitor if a privilege level source destination exiting control associated with a transition from the initial privilege level to the current privilege level is enabled.

39. The system of claim 34, wherein the memory stores a target privilege level.

40. The system of claim 39, wherein the processor is to transition control to the virtual machine monitor if a privilege level match exiting control is enabled and the current privilege level is the same as the target privilege level.

41. The system of claim 39, wherein the processor is to transition control to the virtual machine monitor if a privilege level ceiling exiting control is enabled and the current privilege level is more privileged than the target privilege level.

42. The system of claim 39, wherein the processor is to transition control to the virtual machine monitor if a privilege level floor exiting control is enabled and the current privilege level is less privileged than the target privilege level.

43. The system of claim 39, wherein the target privilege level is variable.

44. The system of claim 39, wherein the target privilege level is fixed.

45. The system of claim 34, wherein control transitions to the virtual machine monitor before execution of an instruction in the guest software.

46. The system of claim 34, wherein control transitions to the virtual machine monitor after execution of an instruction in the guest software.

47. An apparatus having a processor comprising:
a first means for evaluating a current privilege level of a guest software executing in a virtual machine;
a second means for transitioning control to a virtual machine monitor if the current privilege level meets a privilege level exiting criteria, wherein the privilege level exit criteria is enabled and disabled to allow for selective exiting;
a third means for determining an initial privilege level of the guest software; and
a fourth means for transitioning control to the virtual machine monitor if a privilege level change exiting control is enabled and the current privilege level is different from the initial privilege level.

48. The apparatus of claim 47, further comprising:
a fourth means for transitioning control to the virtual machine monitor if a privilege level increase exiting control is enabled and the current privilege level is more privileged than the initial privilege level.

49. The apparatus of claim 47, further comprising:
a fourth means for transitioning control to the virtual machine monitor a privilege level decrease exiting control is enabled and if the current privilege level is less privileged than the initial privilege level.

50. The apparatus of claim 47, further comprising:
a fourth means for transitioning control to the virtual machine monitor if a privilege level source destination exiting control associated with a transition from the initial privilege level to the current privilege level is enabled.

51. The apparatus of claim 47, further comprising:
a third means for storing a target privilege level; and
a fourth means for transitioning control to the virtual machine monitor if a privilege level match exiting control is enabled and the current privilege level is the same as the target privilege level.

52. The apparatus of claim 47, further comprising:
a third means for storing a target privilege level; and
a fourth means for transitioning control to the virtual machine monitor if a privilege level ceiling exiting control is enabled and the current privilege level is more privileged than the target privilege level.

53. The apparatus of claim 47, further comprising:
a third means for storing a target privilege level; and
a fourth means for transitioning control to the virtual machine monitor if a privilege level floor exiting control is enabled and the current privilege level is less privileged than the target privilege level.

* * * * *